United States Patent
Kiwaki

(10) Patent No.: US 10,266,011 B2
(45) Date of Patent: Apr. 23, 2019

(54) PNEUMATIC TIRE

(71) Applicant: BRIDGESTONE CORPORATION, Chuo-ku, Tokyo (JP)

(72) Inventor: Yukihiro Kiwaki, Kodaira (JP)

(73) Assignee: BRIDGESTONE CORPORATION, Chuo-Ku, Tokyo (JP)

( * ) Notice: Subject to any disclaimer, the term of this patent is extended or adjusted under 35 U.S.C. 154(b) by 621 days.

(21) Appl. No.: 14/132,453

(22) Filed: Dec. 18, 2013

(65) Prior Publication Data

US 2014/0174618 A1 Jun. 26, 2014

(30) Foreign Application Priority Data

Dec. 20, 2012 (JP) .................. 2012-278361

(51) Int. Cl.
*B60C 11/03* (2006.01)
*B60C 11/13* (2006.01)
*B60C 11/01* (2006.01)
*B60C 11/11* (2006.01)

(52) U.S. Cl.
CPC .......... *B60C 11/0309* (2013.01); *B60C 11/01* (2013.01); *B60C 11/0304* (2013.01); *B60C 11/11* (2013.01); *B60C 11/13* (2013.01); *B60C 11/1376* (2013.01); *B60C 11/1384* (2013.01); *B60C 11/1392* (2013.01); *B60C 11/0306* (2013.01); *B60C 11/0316* (2013.01); *B60C 2011/013* (2013.01)

(58) Field of Classification Search
CPC ............. B60C 11/0306; B60C 11/0309; B60C 11/0316; B60C 11/01; B60C 11/11; B60C 11/13; B60C 11/1384; B60C 11/1392; B60C 11/0304; B60C 11/1376; B60C 2011/013
USPC ...................................... 152/209.21
See application file for complete search history.

(56) References Cited

U.S. PATENT DOCUMENTS 6,250,353 B1 * 6/2001 Maxwell ............. B60C 11/0316
152/209.15
2012/0067478 A1 3/2012 Sato

FOREIGN PATENT DOCUMENTS

| DE | 102010017743 A1 * | 1/2012 | ............. B60C 11/01 |
|---|---|---|---|
| JP | 5319022 A | 12/1993 | |
| JP | 2000-280711 A | 10/2000 | |
| JP | 2003211915 A | 7/2003 | |
| JP | 2010155503 A | 7/2010 | |
| JP | 4659966 B2 | 3/2011 | |

* cited by examiner

*Primary Examiner* — Seyed Masoud Malekzadeh
(74) *Attorney, Agent, or Firm* — Sughrue Mion, PLLC

(57) ABSTRACT

A pneumatic tire is provided that has enhanced traction performance. A shoulder main body portion of a first shoulder block is formed with a step portion projecting out in a tire circumferential direction. A height of the step portion is set lower than a height of a tread face of the shoulder main body portion and higher than the height of a lug groove. The step portion extends from a tire equatorial plane side end portion of the shoulder main body portion, beyond a tire width direction ground contact edge, to a tire shoulder portion.

11 Claims, 3 Drawing Sheets

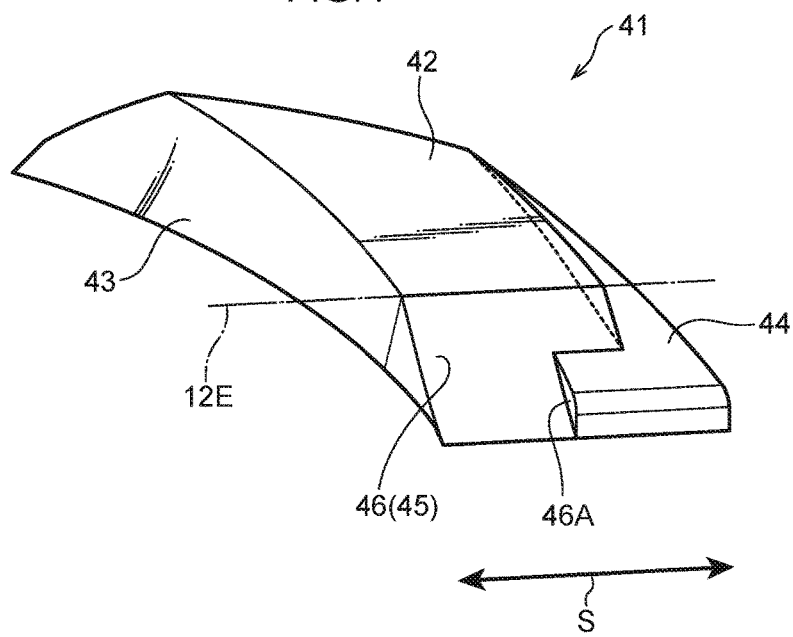
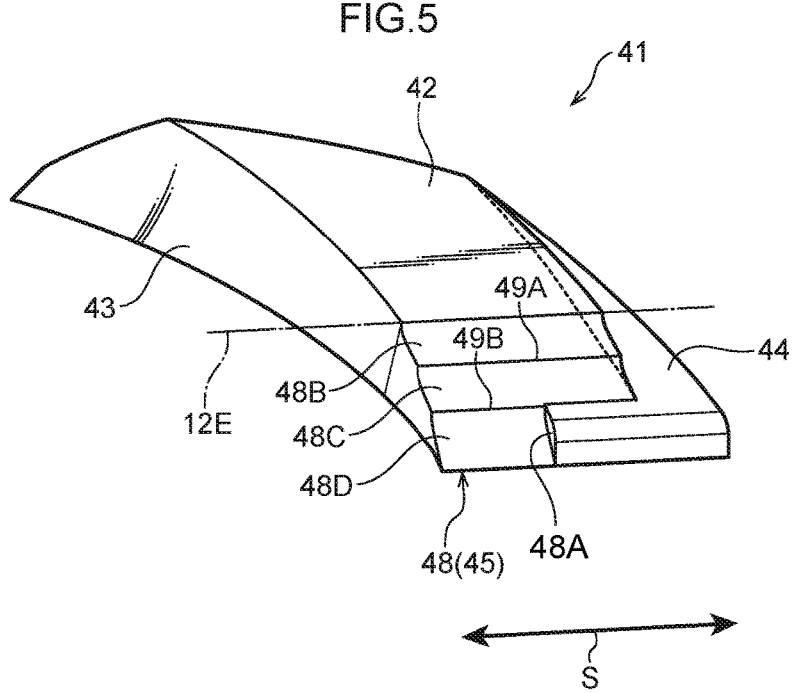

PNEUMATIC TIRE

CROSS-REFERENCE TO RELATED APPLICATION

This application claims priority under 35 USC 119 from Japanese Patent Application No. 2012-278361, filed Dec. 20, 2012, the disclosure of which is incorporated by reference herein.

BACKGROUND

Field of the Invention

The present invention relates to a pneumatic tire.

Related Art

Provided is a pneumatic tire with a block pattern having excellent traction performance to be used as tread pattern suitable for travel on unpaved road. For example, Japanese Patent No. 4659966 describes a pneumatic tire tread with block pattern excelling in off road traction performance.

On an unpaved road, a side in the vicinity of a tire tread edge readily makes contact with the road surface. Moreover, a tire shoulder portion which is at the outer side of a tread edge makes contact with an inclined face on wet, muddy ground. There is accordingly demand for tire shoulder portion to contribute to traction performance.

SUMMARY

In consideration of the above circumstances, aspects of the present invention provide a pneumatic tire with enhanced traction performance.

A pneumatic tire according to a first aspect of the present invention includes: a block row in which blocks are arranged in a row around a tire circumferential direction, each of the blocks including a shoulder side wall at a location which is further to an outer side in a tire width direction than a ground contact edge in the tire width direction; and a step portion that is formed at a side wall of each of the blocks configuring the block row so as to project from the side wall in the tire circumferential direction, a height of the step portion being lower than a tread face and higher than a lug groove that is between the blocks, and the step portion extending further to the outer side in the tire width direction than the ground contact edge in the tire width direction.

The pneumatic tire of the first aspect enables excellent traction performance to be obtained due to the block including the shoulder side wall at the location which is further to the outer side in the tire width direction than the ground contact edge in tire width direction.

Excellent traction performance can moreover be obtained due to the step portion being formed at the side wall of the block and the height of the step portion being lower than the tread face and higher than the lug groove.

Traction performance can moreover be enhanced due to the step portion extending and an end thereof being terminated further to the outer side in the tire width direction than the ground contact edge in tire width direction.

In a pneumatic tire according to a second aspect of the present invention, the shoulder side wall includes a curved face whose center of curvature is at an outer side of the block.

According to the above configuration, traction performance can be enhanced due to enlarging the surface of the shoulder side wall.

In a pneumatic tire of a third aspect of the present invention, a protrusion portion projecting towards the outer side in the tire width direction is formed at the shoulder side wall of a portion of the blocks of the block row.

According to the above configuration, the protrusion portion can enhance traction performance due to increasing a surface area of a wall surface facing towards outside in the tire circumferential direction of the block.

In a pneumatic tire of a fourth aspect of the present invention, the height of the step portion is from 10% to 90% of the height of the block.

Traction performance can be effectively shown due to setting the height of the step portion within the above range.

By configuring the pneumatic tire of the first aspect as described above, traction performance can be enhanced by the step portion extending further to outside in the tire width direction than the ground contact edge in tire width direction.

BRIEF DESCRIPTION OF THE DRAWINGS

An embodiment of the invention will be described in detail with reference to the following figures, wherein:

FIG. 4 is an enlarged perspective view illustrating a first shoulder block (with a flat outer wall portion) of a pneumatic tire of the present exemplary embodiment as viewed along a direction from the bottom right of FIG. 1; and FIG. 5 is an enlarged perspective view illustrating a first shoulder block (with a step shaped outer wall portion) of a pneumatic tire of the present exemplary embodiment.

DETAILED DESCRIPTION

Explanation follows regarding a pneumatic tire 10 according to an exemplary embodiment of the present invention, with reference to the drawings.

Figure 1:
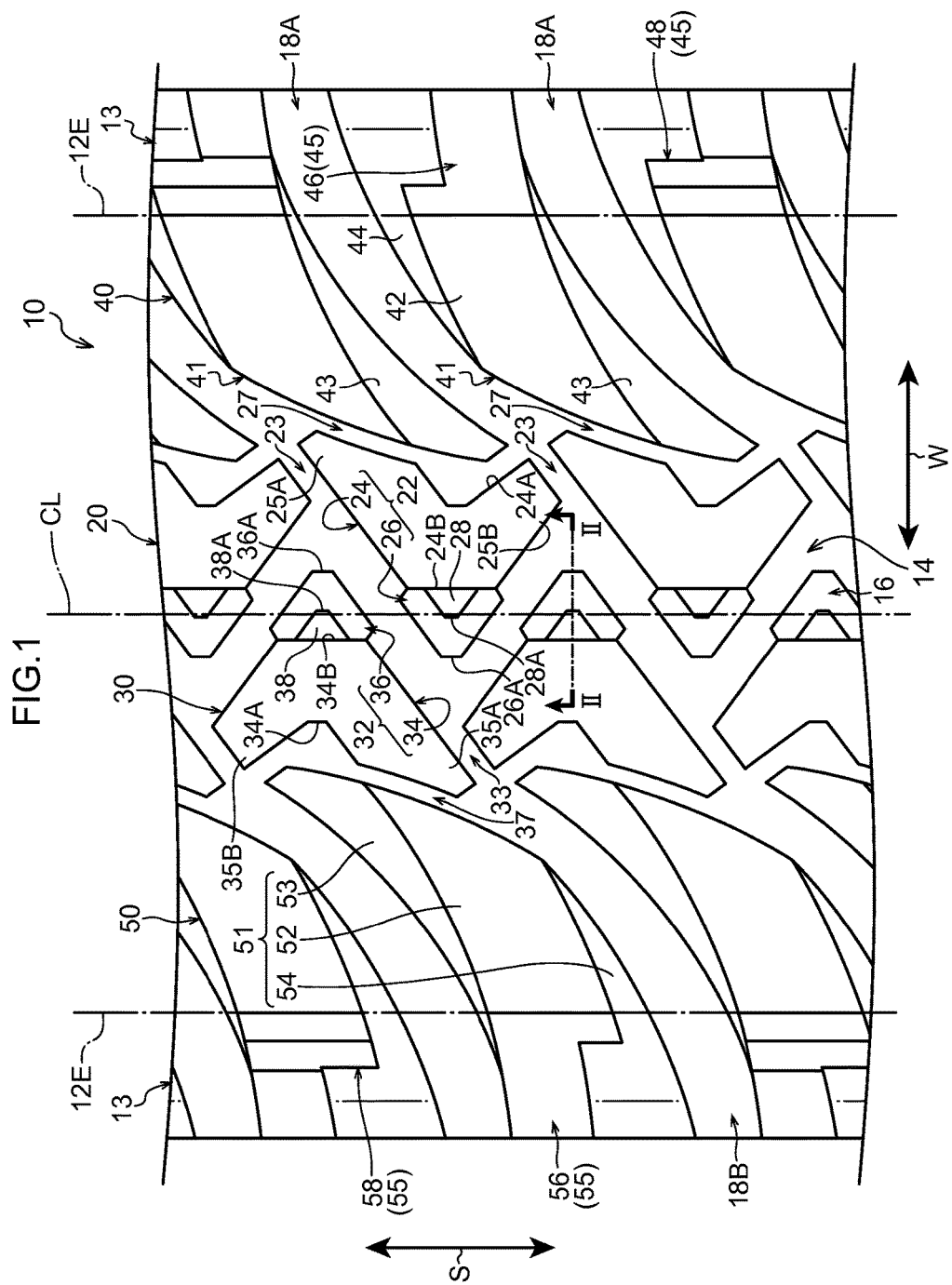
FIG. 1 is an opened-out view of a tread, illustrating a surface of a pneumatic tire according to a present exemplary embodiment.

FIG. 1 is an opened-out view illustrating a tread 12 of the pneumatic tire 10. The shape of the tread 12 of the pneumatic tire 10 of the present exemplary embodiment has left-right symmetry about a tire equatorial plane CL. Note that tire width direction ground contact edges 12E of the tread 12 are defined as edges when the pneumatic tire 10 is mounted to a standard rim, as defined in the JATMA YEAR BOOK (2012 edition, Japan Automobile Tire Manufacturers Association standards), inflated with an internal pressure of 100% air pressure (maximum air pressure) corresponding to the maximum load (load shown in bold in the internal pressure-load correspondence table) for the applicable size/ply rating in JATMA YEAR BOOK, and the maximum load is applied thereto. It should be noted that where the location of use or manufacturing location use TRA standards or ETRTO standards, then these respective standards are adhered to.

Note that the tire width direction ground contact edges 12E are the tire width direction ground contact edges on a paved road, and on a slope or a bumpy portion on a unpaved road, ground contact occurs to at a portion at the width direction outside of the tire width direction ground contact edge.

Block height refers to a distance from the tire axis, with the block height being higher the further the distance from the tire axis, and the block height being lower the closer the distance from the tire axis.

In FIG. 1, the arrow W indicates the tire width direction of the tread 12, and the arrow S indicates the tire circumferential direction of the tread. Portions further to tire shoulder sides than the tire width direction ground contact edges 12E configure tire shoulder portions 13.

The tread 12 of the pneumatic tire 10 of the present exemplary embodiment is formed with a pair of rows of blocks, sandwiching the tire equatorial plane CL. One of the rows of blocks configures a first block row 20, and the other configures a second block row 30.

The first block row 20 is configured by plural first blocks 22. The second block row 30 is configured by plural second blocks 32. The first block 22 and the second block 32 have substantially V shape, and are disposed so as to be convex towards the mutually facing sides. The first blocks 22 and the second blocks 32 are disposed in a staggered pattern along the tire circumferential direction S. Leading end portions of the first block 22 and the second block 32, that are V-shaped in plan view, overlap with each other in the tire width direction W.

Figure 2:
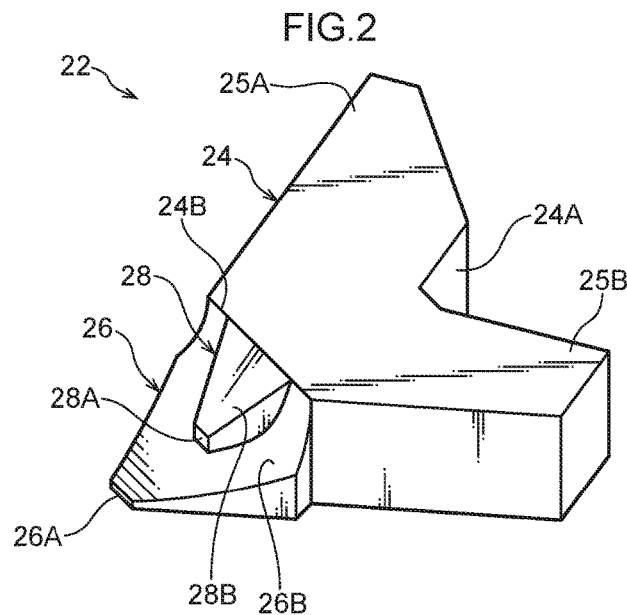
FIG. 2 is an enlarged perspective view illustrating a first block of a pneumatic tire of the present exemplary embodiment, as viewed along a direction from the bottom left of FIG. 1.

As illustrated in FIG. 2, the first block 22 include a first main body portion 24 and a first inclined wall portion for groove 26. The first main body portion 24 is disposed on the one side of the tire equatorial plane CL and includes a diagonal main body portion 25A forming one side of a two-branched V shape, and a diagonal main body portion 25B forming the other side of the V shape. The diagonal main body portion 25A and the diagonal main body portion 25B are continuous (contiguous) to each other at an end portion on the tire equatorial plane CL side, and are inclined with respect to the tire circumferential direction S. The diagonal main body portion 25B is formed shorter than the diagonal main body portion 25A. A recessed (concave) portion 24A that is open towards the tire shoulder side is formed between the diagonal main body portion 25A and the diagonal main body portion 25B. The angle forming the recessed portion 24A between the diagonal main body portion 25A and the diagonal main body portion 25B is set within a range of 45 degrees to 110 degrees. Such a setting enables the angles of the diagonal main body portion 25A and the diagonal main body portion 25B with respect to the tire circumferential direction S to be set with good balance in order to secure traction performance. An upper face of the first main body portion 24 configures the tread face of the tread 12, that is flat and uniform in height. An end side of the first main body portion 24 at tire equatorial plane CL side configures an edge for groove 24B running along the tire circumferential direction S.

Figure 3:
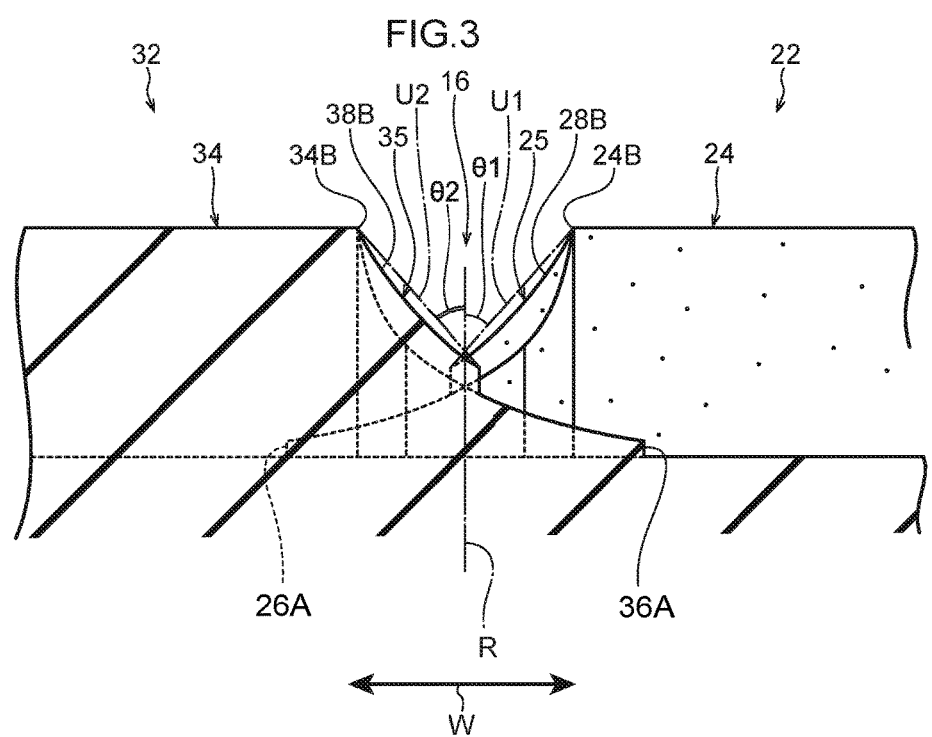
FIG. 3 is a cross-section taken along line II-II of FIG. 1.

The first inclined portion wall for groove 26 is formed extending from the edge for groove 24B so as to be across the tire equatorial plane CL. The tire circumferential direction S length of the first inclined wall portion for groove 26 becomes slightly longer on progression away from the edge for groove 24B, and therefrom tapers on progression towards a leading end 26A, so as to have a substantially triangular shape. As illustrated in FIG. 3, the height of the first inclined wall portion for groove 26 becomes lower on progression from the edge for groove 24B towards the leading end 26A, forming an inclined wall face for groove 26B that has a gradient. The inclined wall face for groove 26B is configured by a curved face with center of curvature thereof being at the outside of the first block 22.

At the inclined wall face for groove 26B, a projection portion 28 projecting out from the inclined wall face for groove 26B. The projection portion 28 is formed extending from the edge for groove 24B towards the leading end 26A side, and a leading end 28A of the projection portion 28 terminates within the inclined wall face for groove 26B. The projection portion 28 is configured in a substantially triangular shape that tapers on progression towards the leading end 28A as viewed from above. As illustrated in FIG. 3, the height of an upper face 28B of the projection portion 28 decreases on progression from the edge for groove 24B towards the leading end 28A so as to form a gradient. As viewed along the tire circumferential direction S, the upper face 28B of the projection portion 28 is formed with a concave shape so as to be positioned further to the first block 22 side than a straight line U1 connecting the edge for groove 24B and an upper side of the leading end 28A. An angle θ1 between the straight line U1 and the tire radial direction R is set within a range of 20 degrees and 70 degrees. The maximum value of the height of the projection portion 28 (the height from a front face of the inclined wall face for groove 26B) is set within a range of 5 mm to 15 mm.

The first block 22 and the second block 32 are configured in the same shape, and are disposed with point symmetry to each other. As illustrated in FIG. 1, the second block 32 includes a second main body portion 34, a second inclined wall portion for groove 36, a recessed (concave) portion 34A, diagonal main body portions 35A and 35B, an edge for groove 34B, a leading end 36A, an inclined wall face for groove 36B, a projection portion 38, and a leading end 38A. Each of these portions respectively corresponds to the first main body portion 24, the first inclined wall portion for groove 26, the recessed portion 24A, the diagonal main body portions 25A and 25B, the edge for groove 24B, the leading end 26A, the inclined wall face for groove 26B, the projection portion 28 and the leading end 28A of the first block 22. As illustrated in FIG. 3, the height of an upper face 38B of the projection portion 38 decreases on progression from the edge for groove 34B towards the leading end 38A so as to form a gradient. As viewed along the tire circumferential direction S, the upper face 38B of the projection portion 38 is formed so as to be positioned further to the second block 32 side than a straight line U2 connecting the edge for groove 34B and the upper end of the leading end 38A. An angle θ2 between the straight line U2 and the tire radial direction R is set within a range of 20 degrees to 70 degrees. The maximum value of the height of the projection portion 28 is set within a range of 5 mm to 15 mm.

The leading end 26A of the first block 22 is disposed further to the second main body portion 34 side (the recessed portion 34A side) than the edge for groove 34B of the second block 32 in the tire width direction W. The leading end 36A of the second block 32 is disposed further to the first main body portion 24 side (the recessed portion 24A side) than the edge for groove 24B of the first block 22 in the tire width direction W.

As illustrated in FIG. 1, first fine grooves 23 are each formed between two first blocks 22 which are adjacent in the tire circumferential direction S. Second fine grooves 33 are each formed between two second blocks 32 which are adjacent in the tire circumferential direction S.

A zigzag main groove 14 is configured between the first block row 20 and the second block row 30, so as to be back and forth across the tire equatorial plane CL in a zigzag pattern. As seen in plan view, on the inclined wall face for groove 26B and the inclined wall face for groove 36B, a straight main groove 16 is configured extending in a straight line along the tire circumferential direction S in a portion partitioned (defined) between the edges for groove 24B and the edges for groove 34B. The straight main groove 16 is formed over the tire equatorial plane CL.

A first shoulder block row 40 is formed to the tire shoulder side with respect to the first block row 20. A second shoulder block row 50 is formed to the tire shoulder side with respect to the second block row 30. The first shoulder block row 40 is configured by plural first shoulder blocks 41, and the second shoulder block row 50 is configured by plural second shoulder blocks 51.

An intermediate groove 27 is each formed between the first shoulder block 41 and the first block 22. The intermediate groove 27 divides (parts) the first shoulder block 41 and the first block 22 from each other in the tire width direction W. Lug groove 18A are each formed between the adjacent first shoulder blocks 41 of the first shoulder block row 40, each lug groove 18A extending from a join portion of the first fine (narrow) groove 23 and the intermediate groove 27 towards the tire shoulder.

An intermediate groove 37 is each formed between the second shoulder block 51 and the second block 32. The intermediate groove 37 divides (parts) the second shoulder block 51 and the second block 32 from each other in the tire width direction W. Lug grooves 18B are each formed between the adjacent second shoulder blocks 51 of the second shoulder block row 50, each lug groove 18B extending from a join portion of the second fine (narrow) groove 33 and the intermediate groove 37 towards the tire shoulder.

The first shoulder block 41 is formed extending from a position which is further towards the tire shoulder side than the first main body portion 24 of the first block 22. The first shoulder block 41 includes a shoulder main body portion 42, an inside inclined wall portion 43, a step portion 44, and an outer wall portion 45.

The shoulder main body portion 42 sandwiches the first intermediate groove 27 with the diagonal main body portion 25A and extends from the diagonal main body portion 25A side (the first intermediate groove 27) towards the tire shoulder side, and is formed as far as the tire width direction ground contact edge 12E. The tire width direction ground contact edge 12E is formed by tread edge portions of the shoulder main body portions 42.

The inside inclined wall portion 43 configures a side wall (a first side wall) on one tire circumferential direction S side of the shoulder main body portion 42, and is formed extending towards the diagonal main body portion 25B. The inside inclined wall portion 43 configures an incline with height decreasing on progression away from the shoulder main body portion 42. A front face of the inside inclined wall portion 43 is configured by a curved face with a center of curvature thereof being at the tire radial direction outside of the first shoulder block 41. The angle of inclination of the inside inclined wall portion 43 is larger on the tire width direction ground contact edge 12E side than on the tire equatorial plane CL side. An angle of a lower side, which is along the lug groove 18A, of the inside inclined wall portion 43 with respect to the tire circumferential direction S becomes smaller on progression from the tire width direction ground contact edge 12E side towards the tire equatorial plane CL side.

The step portion 44 is formed projecting out in the tire circumferential direction S from the opposite side of the shoulder main body portion 42 from the inside inclined wall portion 43 in the tire circumferential direction S. More specifically, the step portion 44 is formed projecting out from a second side wall opposite from the first side wall along the tire circumferential direction S. The height of the step portion 44 is set lower than the tread face of the height of the shoulder main body portion 42, and higher than the height of the lug grooves 18A. The tire circumferential direction S width of the step portion 44 is wider on the tire shoulder side than on the tire equatorial plane CL side. The step portion 44 exists from a tire equatorial plane CL side end portion of the shoulder main body portion 42, crossing the tire width direction ground contact edge 12E, to the tire shoulder portion 13, with the step portion 44 formed so as to be around a part of the tire shoulder side of the shoulder main body portion 42. The height of the step portion 44 is preferably within a range of 10% to 90% of the height of the shoulder main body portion 42. By setting the height of the step portion 44 within this range, traction performance can be effectively realized.

There are 2 configurations of the outer wall portion 45. In the following explanation, one configuration is referred to as a "flat outer wall portion 46", and the other configuration is referred to as a "step shaped outer wall portion 48". The outer wall portions 45 of the first shoulder blocks 41 are alternately formed by the flat outer wall portions 46 and the step shaped outer wall portions 48 around the tire circumferential direction S.

Note that in the present exemplary embodiment, the flat outer wall portions 46 and the step shaped outer wall portions 48 are alternately disposed around the tire circumferential direction S, however they do not have to be disposed in this manner. One step shaped outer wall portion 48 may be disposed every two flat outer wall portions 46, or the step shaped outer wall portions 48 are may be randomly disposed.

As illustrated in FIG. 4, the flat outer wall portion 46 configures a tire shoulder side wall of the shoulder main body portion 42, and is configured by an inclined face that becomes gradually lower on progression away from the tire width direction ground contact edge 12E. The flat outer wall portion 46 is configured with a curved face with a center of curvature being at the outside of the first shoulder block 41. At one tire circumferential direction S side of the flat outer wall portion 46, the step portion 44 extends out from the inner position in the tire width direction W further than the tire width direction ground contact edge 12E, and is formed so as to be around the outer side in the tire width direction W of the flat outer wall portion 46. At the flat outer wall portion 46, a step face 46A, which corresponds to a distal end of a portion (a second step portion) of the step portion 44 extending in the tire circumferential direction S, facing in the tire circumferential direction S is formed between the flat outer wall portion 46 and the step portion 44. Specifically, the step portion 44 includes a portion (a first step portion) extending in a direction intersecting the tire circumferential direction S and the second step portion which continuously extends from the first step portion in the tire circumferential direction S.

As illustrated in FIG. 4, the step face 46A corresponding to the distal end of the second step portion ends between the side walls of the first shoulder block 41. The step face 46A may end in a middle portion between the side walls of the first shoulder block 41. More specifically, the step face 46A may be provided substantially at a middle point of the shoulder side wall in the tire circumferential direction between the side walls of the first shoulder block 41.

As illustrated in FIG. 5, the step shaped outer wall portion 48 configures a tire shoulder side wall of the shoulder main body portion 42, and is formed with 3 curved step faces 48B, 48C, 48D in that sequence on progression from the tire width direction ground contact edge 12E towards the tire width direction W outside. A protrusion portion 49A is formed at a boundary portion between the adjacent curved step faces 48B and 48C. A protrusion portion 49B is formed at a boundary portion between the adjacent curved step faces 48C and 48D. The curved step faces 48B, 48C, 48D are respectively configured with curved faces that have centers of curvature thereof being at the outside of the first shoulder block 41. At one tire circumferential direction S side of the step shaped outer wall portion 48, the step portion 44 extends out from the inner position in the tire width direction W further than the tire width direction ground contact edge 12E, and is formed so as to be around the outer side in the tire width direction W of the curved step face 48B. The height of the upper face of the step portion 44 and the height of the protrusion portion 49B are configured substantially the same as each other. A step face 48A facing in the tire circumferential direction S is formed between the curved step face 48D and the step portion 44.

The second shoulder block 51 is formed extending from a position which is further towards the tire shoulder side than the second main body portion 34 of the second block 32. The second shoulder blocks 51 are formed with the same shapes to the first shoulder blocks 41, and are disposed with point symmetry to the first shoulder blocks 41 respectively. A shoulder main body portion 52, an inside inclined wall portion 53, a step portion 54 and an outer wall portion 55 respectively correspond to the shoulder main body portion 42, the inside inclined wall portion 43, the step portion 44 and the outer wall portion 45 of the first shoulder blocks 41. The shoulder main body portion 52 sandwiches the second intermediate groove 37 with the diagonal main body portion 35A and extends from the diagonal main body portion 35A side (the second intermediate groove 37) towards the tire shoulder side, and is formed as far as the tire width direction ground contact edge 12E. The tire width direction ground contact edge 12E is formed by tread edge portions of the shoulder main body portions 52.

There are 2 configurations of the outer wall portion 55. One configuration is a "flat outer wall portion 56" corresponding to the flat outer wall portion 46, and the other configuration is a "step shaped outer wall portion 58" corresponding to the step shaped outer wall portion 48. The outer wall portions 55 of the second shoulder blocks 51 are alternately configured by the flat outer wall portions 56 and the step shaped outer wall portions 58 around the tire circumferential direction S.

Note that in the present exemplary embodiment, the flat outer wall portions 56 and the step shaped outer wall portions 58 are alternately disposed around the tire circumferential direction S, however they do not have to be disposed in this manner. One step shaped outer wall portion 58 may be disposed every two flat outer wall portions 56, or may be randomly disposed.

Explanation follows regarding operation and advantageous effects of the pneumatic tire 10 of the present exemplary embodiment.

In the pneumatic tire 10 of the present exemplary embodiment, the straight main groove 16 that has a straight line shape around the tire circumferential direction S is formed over the tire equatorial plane CL between the edges for groove 24B and the edges for groove 34B. Water discharge performance and mud discharge performance can accordingly be enhanced.

The first block row 20 and the second block row 30 of the pneumatic tire 10 are formed overlapping with each other in the tire width direction W. Tire traction performance can accordingly be enhanced on a poor road surface where mud and the like enter between the first inclined wall portions for groove 26 and the second inclined wall portions for groove 36.

In the first inclined wall portion for groove 26 of the first block 22, the projection portion 28 is formed extending from the edge for groove 24B towards the leading end, and in the second inclined wall portion for groove 36 of the second block 32, the projection portion 38 is formed. Tire traction performance can accordingly be further enhanced.

The leading end 26A of the first block 22 of the present exemplary embodiment is disposed further to the second main body portion 34 side than the edge for groove 34B of the second block 32. The leading end 36A of the second block 32 of the present exemplary embodiment is disposed further to the first main body portion 24 side than the edge for groove 24B of the first block 22. Tire traction performance can accordingly be further enhanced.

The first inclined wall portion for groove 26 and the second inclined wall portion for groove 36 of the present exemplary embodiment are configured with curved faces with their respective centers of curvature to the outside of the blocks. The surfaces of the first inclined wall portion for groove 26 and the second inclined wall portion for groove 36 is accordingly broadened, enabling traction performance to be enhanced. The volume of the groove between adjacent groove edges for groove 24B and 34B also increases, enabling water discharge performance and mud discharge performance to be enhanced.

The first inclined wall portion for groove 26 and the second inclined wall portion for groove 36 are configured so as to taper towards the respective tire width direction leading ends. Generally, the surface area of the block increases as wear of the tread 12 progresses, raising the block rigidity. The ground contact pressure of the tire circumferential direction S edge can accordingly be increased due to a configuration wherein tire circumferential direction S edge becomes shorter accompanying the progression of wear of the tread 12. Traction performance can be maintained since edge having a tire width direction W component becomes longer as wear of the tread 12 progresses.

The projection portions 28 and 38 are tapered on progression towards the tire width direction leading ends. Accordingly, similarly to as described above, by a configuration wherein tire circumferential direction S edge becomes shorter and edge having a tire width direction W component becomes longer as wear of the tread 12 progresses, the ground contact pressure of the edge can be increased, and traction performance can be maintained.

In the present exemplary embodiment, the projection portions 28 and 38 are formed from the edges for groove 24B and 34B respectively. Edges can accordingly be secured when the tread 12 wears down. Moreover, the ends of the projection portions 28 and 38 respectively terminate inside (within) the first inclined wall portion for groove 26 and the second inclined wall portion for groove 36, thereby enabling the groove volume of the zigzag main groove 14 to be secured.

The upper face 28B of the projection portion 28 is formed so as to be contained on the first block 22 side of the straight line connecting the edge for groove 24B and the leading end 28A as viewed along the tire circumferential direction S. As viewed along the tire circumferential direction S, the upper face 38B of the projection portion 38 is also formed so as to be contained on the second block 32 side of the straight line connecting the edge for groove 34B and the leading end 38A. The groove volume of the straight main groove 16 can accordingly be secured.

The angle of inclination of the inside inclined wall portion 43 is larger on the tire width direction ground contact edge 12E side than on the tire equatorial plane CL side. Accordingly, even when mud has entered the lug groove 18A, the mud can be readily discharged from the tire equatorial plane CL side of the inside inclined wall portion 43, where the angle of inclination is small, towards the tire width direction ground contact edge 12E side where the angle of inclination is large.

The angle of the side of the lower end, which is along the lug groove 18A, of the inside inclined wall portion 43 with respect to the tire circumferential direction S becomes smaller on progression from the tire width direction ground contact edge 12E side towards the tire equatorial plane CL side. Water discharge performance and mud discharge performance can accordingly be secured on the tire equatorial plane CL side of the inside inclined wall portion 43, and traction performance can also be enhanced on the tire width direction ground contact edge 12E side of the inside inclined wall portion 43.

The step portion 44 of the present exemplary embodiment extends and the end thereof terminates further towards the tire width direction outside than the tire width direction ground contact edge 12E, such that the step portion 44 is formed further to the tire width direction W outside than the tire width direction ground contact edge 12E, thereby enabling traction performance to be enhanced.

The flat outer wall portion 46 and the curved step faces 48B, 48C, 48D are configured with curved faces that have centers of curvature to the outside of the first shoulder block 41, thereby broadening of the surfaces of the flat outer wall portion 46 and the curved step faces 48B, 48C, 48D, enabling traction performance to be enhanced.

At some of the outer wall portions 45 of the first shoulder blocks 41 and second shoulder blocks 51, the protrusion portions 49A and 49B are formed. The surface areas of the wall faces of the first shoulder block 41 and the second shoulder block 51 facing towards the tire circumferential direction S outside are accordingly increased, enabling traction performance to be enhanced.

What is claimed is:

1. A pneumatic tire comprising:
 a block row in which blocks are arranged in a row around a tire circumferential direction, each of the blocks including:
  a shoulder side wall at a location which is further to an outer side in a tire width direction than a ground contact edge in the tire width direction;
  a first side wall at a first side in the tire circumferential direction; and
  a second side wall at a second side opposite to the first side in the tire circumferential direction, and
 a step portion that is formed at the second side wall of each of the blocks configuring the block row so as to protrude in the tire circumferential direction from the second side wall, wherein:
  the step portion comprising a first step portion and a second step portion, the first step portion extending from a tire equatorial plane side of each of the blocks, crossing the ground contact edge, to a tire shoulder portion such that the first step portion extends further from the ground contact edge to the outer side of the ground contact edge in the tire width direction,
  a height of the step portion is lower than a tread face of each of the blocks, which is provided at an inner side of the ground contact edge in the tire width direction, and is higher than a lug groove that is provided between the blocks,
  the second step portion continuously extends from the first step portion in the tire circumferential direction,
  the second step portion has a distal end in the tire circumferential direction,
  the distal end ends between the first side wall and the second side wall along the tire circumferential direction, and
  the distal end is provided substantially at a middle point of the shoulder side wall in the tire circumferential direction between the first and second side walls.

2. The pneumatic tire of claim 1, wherein the shoulder side wall includes a curved face whose center of curvature is at an outer side of each of the blocks.

3. The pneumatic tire of claim 1, wherein a protrusion portion projecting towards the outer side in the tire width direction is formed at the shoulder side wall of a portion of the blocks of the block row.

4. The pneumatic tire of claim 2, wherein a protrusion portion projecting towards the outer side in the tire width direction is formed at the shoulder side wall of a portion of the blocks of the block row.

5. The pneumatic tire of claim 1, wherein the height of the step portion is from 10% to 90% of a height of a block including the step portion.

6. The pneumatic tire of claim 2, wherein the height of the step portion is from 10% to 90% of a height of a block including the step portion.

7. The pneumatic tire of claim 3, wherein the height of the step portion is from 10% to 90% of a height of a block including the step portion.

8. The pneumatic tire of claim 1, wherein, at the tire shoulder portion, the first step portion, which extends from the tire equatorial plane side crossing the ground contact edge to the tire shoulder portion, further extends in a direction such that the first step portion protrudes from the shoulder side wall.

9. The pneumatic tire of claim 8, wherein the first step portion protrudes from the shoulder side wall in the tire width direction.

10. The pneumatic tire of claim 8, wherein the second step portion extends in the tire circumferential direction such that the second step portion protrudes from the shoulder side wall.

11. The pneumatic tire of claim 1, wherein the second step portion is provided at the tire shoulder portion and extends in the tire circumferential direction such that the second step portion is provided on the shoulder side wall so as to protrude from the shoulder side wall.

* * * * *